US009046976B2

(12) United States Patent
Liu

(10) Patent No.: US 9,046,976 B2
(45) Date of Patent: Jun. 2, 2015

(54) METHOD FOR TRANSMITTING AND DETECTING TOUCH SENSING SIGNALS AND TOUCH DEVICE USING THE SAME

(71) Applicant: Hung-Ta Liu, Zhubei (TW)

(72) Inventor: Hung-Ta Liu, Zhubei (TW)

(*) Notice: Subject to any disclaimer, the term of this patent is extended or adjusted under 35 U.S.C. 154(b) by 205 days.

(21) Appl. No.: 13/628,567

(22) Filed: Sep. 27, 2012

(65) Prior Publication Data

US 2013/0076691 A1 Mar. 28, 2013

Related U.S. Application Data

(63) Continuation-in-part of application No. 13/328,067, filed on Dec. 16, 2011, now Pat. No. 8,933,897, and a continuation-in-part of application No. 13/336,721, filed on Dec. 23, 2011, now abandoned, and a continuation-in-part of application No. 13/336,355, filed on Dec. 23, 2011, now abandoned.

(30) Foreign Application Priority Data

Sep. 28, 2011 (TW) .............................. 100134974 A

(51) Int. Cl.
*G06F 3/044* (2006.01)
*G06F 3/041* (2006.01)
*G06F 3/046* (2006.01)

(52) U.S. Cl.
CPC .............. *G06F 3/044* (2013.01); *G06F 3/0412* (2013.01); *G06F 3/0416* (2013.01); *G06F 3/046* (2013.01)

(58) Field of Classification Search
CPC ....... G06F 3/044; G06F 3/041; G06F 3/0416; G06F 3/0488; G06F 3/0412; G06F 3/046; G06F 3/047

USPC ..................... 345/173, 174; 178/18.06, 18.07
See application file for complete search history.

(56) References Cited

U.S. PATENT DOCUMENTS

| | | | | |
|---|---|---|---|---|
| 5,606,346 A * | 2/1997 | Kai et al. | ........ | 345/173 |
| 5,894,304 A * | 4/1999 | Hirano | ........ | 345/179 |
| 6,417,846 B1 | 7/2002 | Lee | | |
| 6,424,398 B1 * | 7/2002 | Taniguchi | ........ | 349/143 |
| 7,742,041 B2 * | 6/2010 | Lee et al. | ........ | 345/173 |
| 8,243,027 B2 * | 8/2012 | Hotelling et al. | ........ | 345/173 |
| 8,259,086 B2 * | 9/2012 | Agari et al. | ........ | 345/173 |
| 8,325,130 B2 | 12/2012 | Nam | | |
| 8,405,639 B1 * | 3/2013 | Fu | ........ | 345/175 |
| 8,514,189 B2 * | 8/2013 | Wu et al. | ........ | 345/173 |

(Continued)

FOREIGN PATENT DOCUMENTS

| CN | 1169557 A | 1/1998 |
|---|---|---|
| CN | 1591093 A | 3/2005 |

(Continued)

*Primary Examiner* — Dmitriy Bolotin
(74) *Attorney, Agent, or Firm* — The Webb Law Firm

(57) ABSTRACT

A method for transmitting and detecting touch sensing signals in a touch device having a set of parallel conducting lines includes: providing a work signal and a touch sensing signal to a selected portion of the conducting lines that serve as touch sensing lines and that cooperate to define a touch sensing area; and detecting the touch sensing lines to obtain a detecting signal that corresponds to the touch sensing signal and that indicates occurrence of a touch event, so as to determine at least one of a position and an intensity of the touch event. For each of the touch sensing lines, the work signal is provided during a first time interval and the touch sensing signal is provided during a second time interval.

25 Claims, 14 Drawing Sheets

(56) References Cited

U.S. PATENT DOCUMENTS

| | | | |
|---|---|---|---|
| 8,552,989 B2* | 10/2013 | Hotelling et al. | 345/173 |
| 2004/0105040 A1 | 6/2004 | Oh et al. | |
| 2004/0217945 A1* | 11/2004 | Miyamoto et al. | 345/173 |
| 2006/0017710 A1* | 1/2006 | Lee et al. | 345/173 |
| 2006/0066586 A1* | 3/2006 | Gally et al. | 345/173 |
| 2006/0067651 A1* | 3/2006 | Chui | 385/147 |
| 2006/0077122 A1* | 4/2006 | Gally et al. | 345/32 |
| 2006/0238487 A1* | 10/2006 | Shih | 345/102 |
| 2006/0256093 A1* | 11/2006 | Furukawa et al. | 345/173 |
| 2007/0002009 A1 | 1/2007 | Pasch et al. | |
| 2009/0021884 A1 | 1/2009 | Nakamura | |
| 2009/0207154 A1* | 8/2009 | Chino | 345/175 |
| 2009/0267905 A1 | 10/2009 | Hsu et al. | |
| 2009/0279162 A1* | 11/2009 | Chui | 359/290 |
| 2010/0013788 A1 | 1/2010 | Park et al. | |
| 2010/0045630 A1* | 2/2010 | Gu et al. | 345/174 |
| 2010/0045631 A1* | 2/2010 | Chen et al. | 345/174 |
| 2010/0045635 A1* | 2/2010 | Soo | 345/178 |
| 2010/0123673 A1 | 5/2010 | Nam | |
| 2010/0214248 A1* | 8/2010 | Takano et al. | 345/173 |
| 2010/0295810 A1* | 11/2010 | Nagata et al. | 345/173 |
| 2010/0295819 A1* | 11/2010 | Ozeki et al. | 345/174 |
| 2010/0328249 A1* | 12/2010 | Ningrat et al. | 345/174 |
| 2010/0328336 A1* | 12/2010 | Si | 345/589 |
| 2011/0007013 A1* | 1/2011 | Shoji | 345/173 |
| 2011/0025635 A1* | 2/2011 | Lee | 345/173 |
| 2011/0096251 A1* | 4/2011 | Son et al. | 349/15 |
| 2011/0109568 A1* | 5/2011 | Wu et al. | 345/173 |
| 2011/0109622 A1* | 5/2011 | Son et al. | 345/419 |
| 2011/0122096 A1* | 5/2011 | Kim et al. | 345/175 |
| 2011/0157058 A1* | 6/2011 | Bita et al. | 345/173 |
| 2011/0205178 A1* | 8/2011 | Yoshida et al. | 345/173 |
| 2011/0210927 A1* | 9/2011 | Mizuhashi et al. | 345/173 |
| 2011/0227588 A1* | 9/2011 | Chen et al. | 324/654 |
| 2011/0267295 A1* | 11/2011 | Noguchi et al. | 345/173 |
| 2012/0026414 A1* | 2/2012 | Hsiao et al. | 348/744 |
| 2012/0075216 A1* | 3/2012 | Black et al. | 345/173 |
| 2012/0075240 A1* | 3/2012 | Kida et al. | 345/174 |
| 2012/0092279 A1* | 4/2012 | Martin | 345/173 |
| 2012/0092294 A1* | 4/2012 | Ganapathi et al. | 345/174 |
| 2012/0146936 A1* | 6/2012 | Liu | 345/174 |
| 2012/0169400 A1* | 7/2012 | Liu | 327/517 |
| 2012/0169629 A1* | 7/2012 | Shih et al. | 345/173 |
| 2012/0319977 A1* | 12/2012 | Kuge | 345/173 |

FOREIGN PATENT DOCUMENTS

| | | |
|---|---|---|
| CN | 101019071 A | 8/2007 |
| CN | 101937296 A | 1/2011 |
| EP | 0250931 A2 | 1/1988 |
| EP | 2172834 A2 | 4/2010 |
| FR | 2934908 A1 | 2/2010 |
| JP | 3220405 B2 | 10/2001 |
| TW | 200506480 | 2/2005 |
| TW | 200533591 | 10/2005 |
| TW | 200624974 | 7/2006 |
| TW | 200627041 | 8/2006 |
| TW | 200939097 A | 9/2009 |
| TW | 201007090 A1 | 2/2010 |
| TW | 201017306 A1 | 5/2010 |
| TW | 201024203 A | 7/2010 |
| TW | 201044241 A1 | 12/2010 |
| TW | M393740 U1 | 12/2010 |
| WO | WO 2011102038 A1 * | 8/2011 |

* cited by examiner

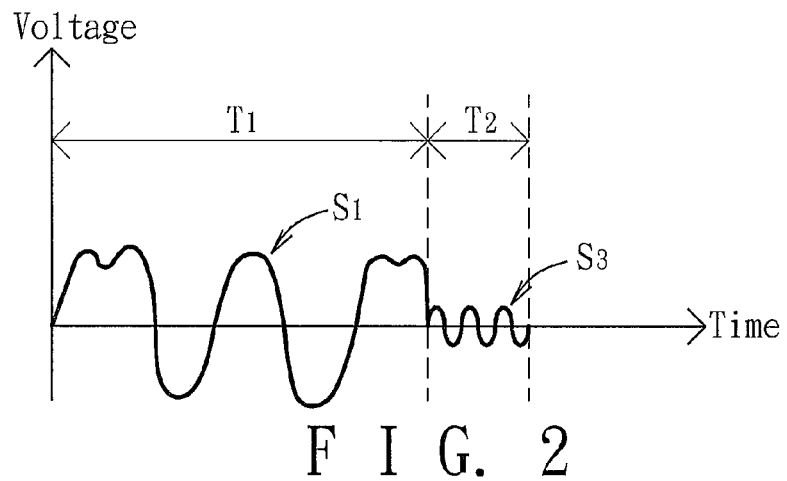
F I G. 2
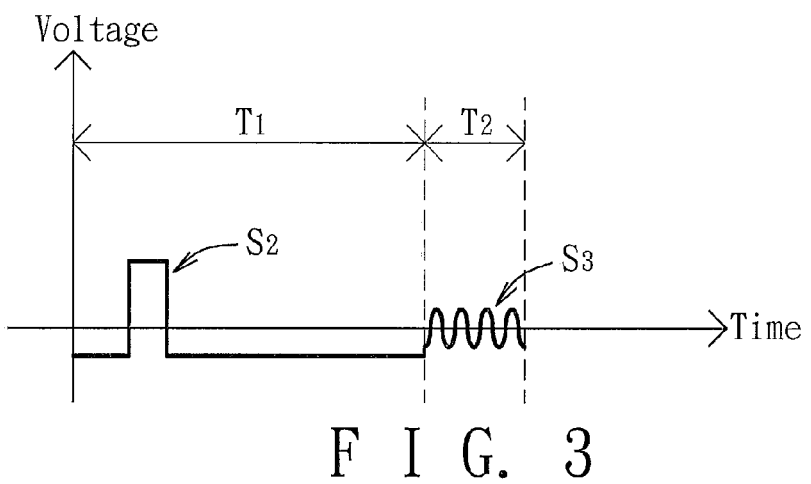
F I G. 3
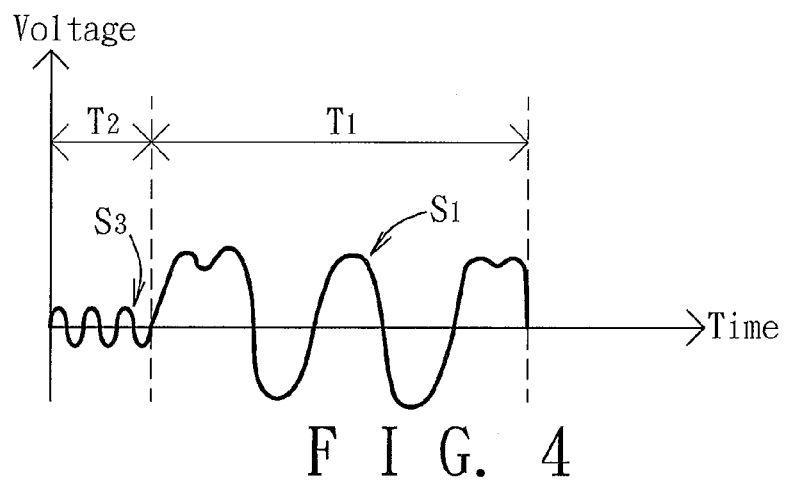
F I G. 4

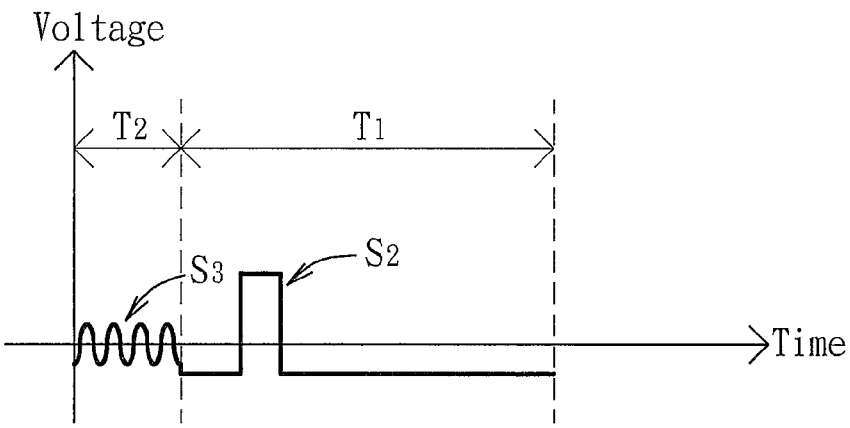
F I G. 5
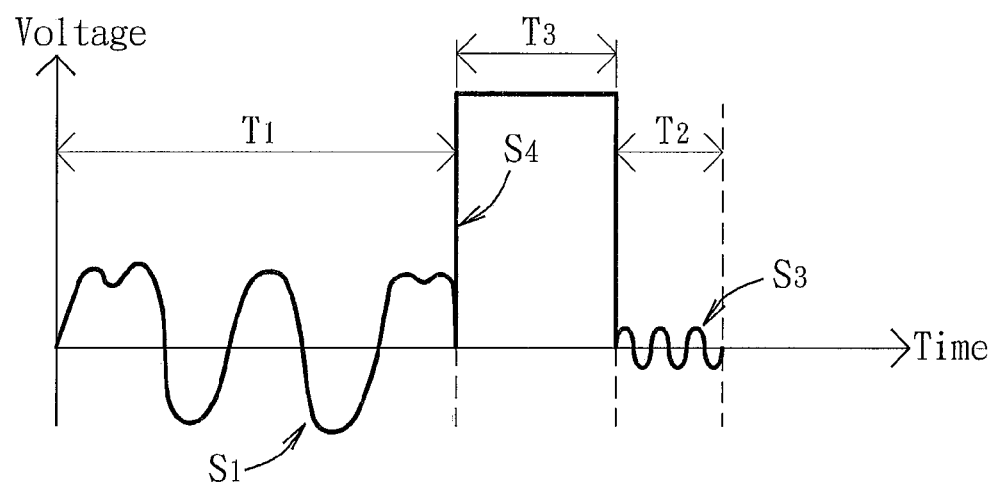
F I G. 6

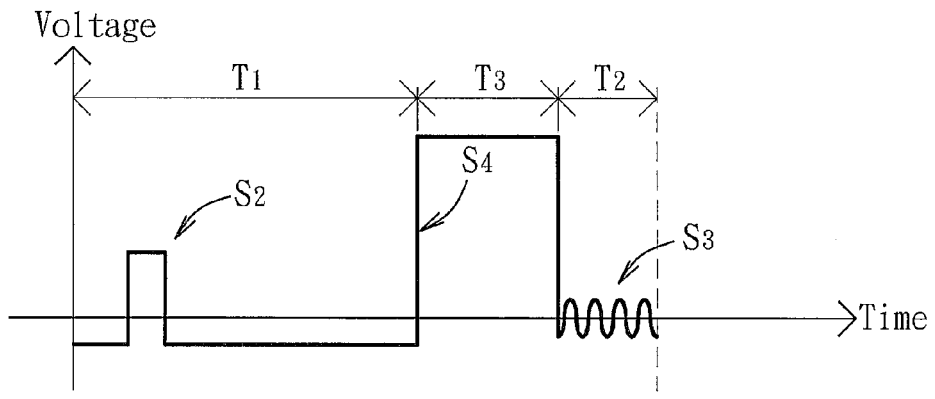
F I G. 7
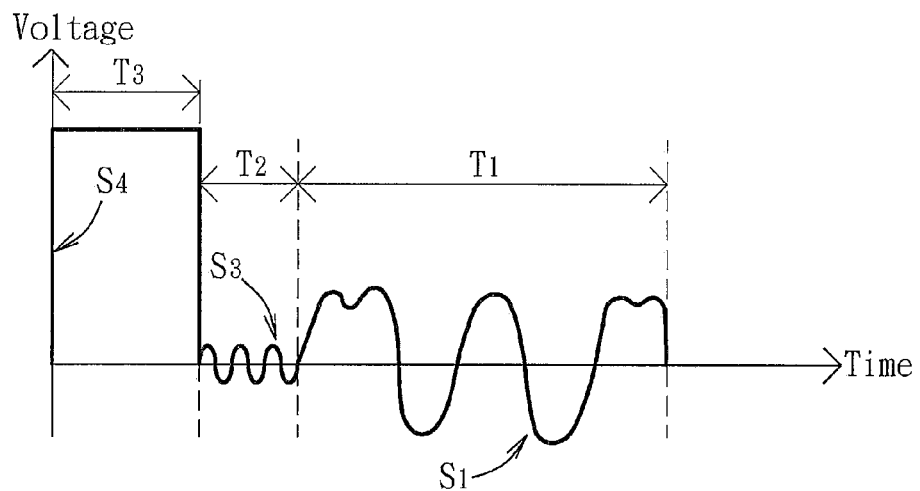
F I G. 8
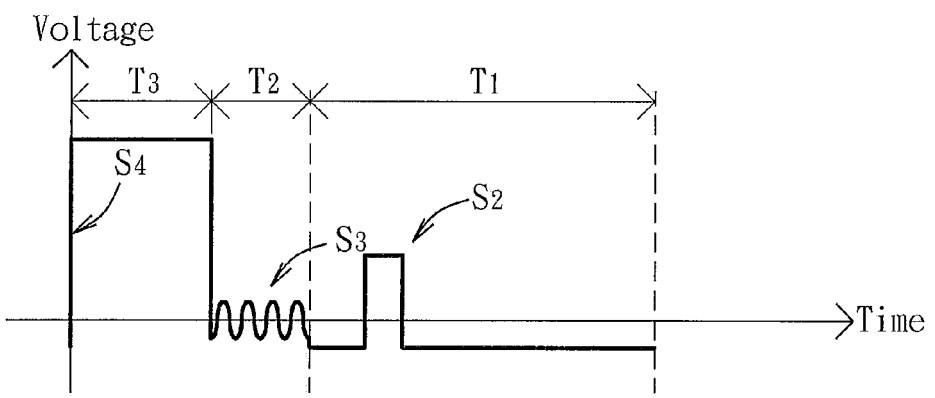
F I G. 9

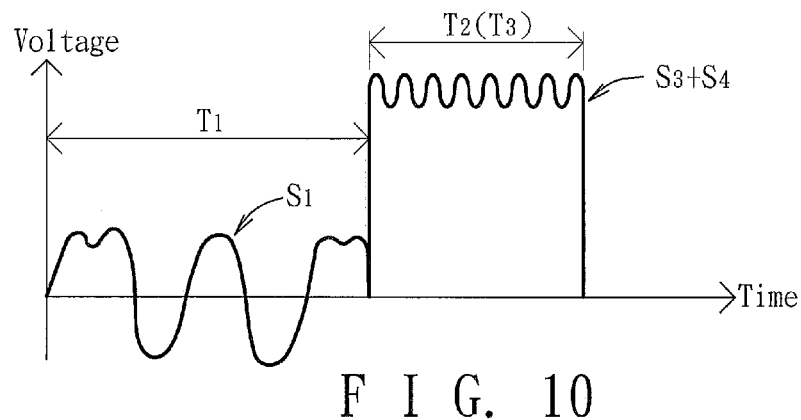
F I G. 10
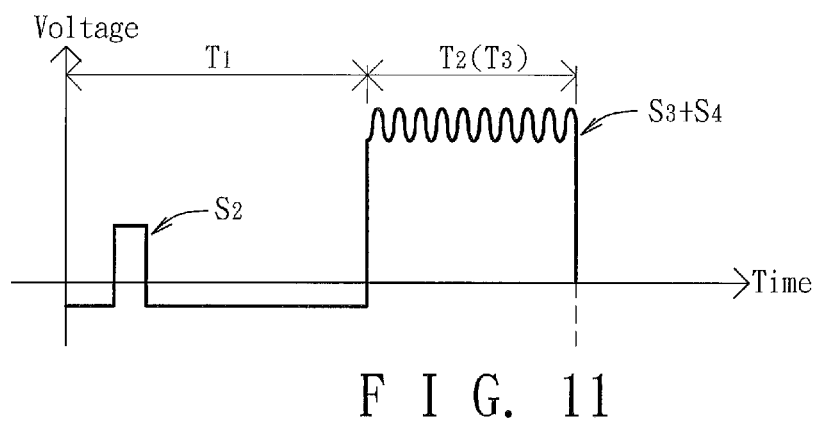
F I G. 11
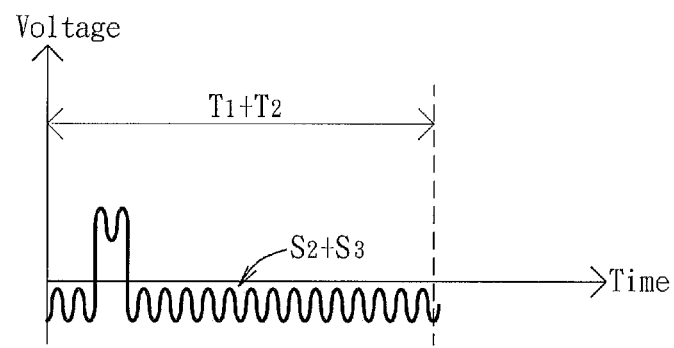
F I G. 12

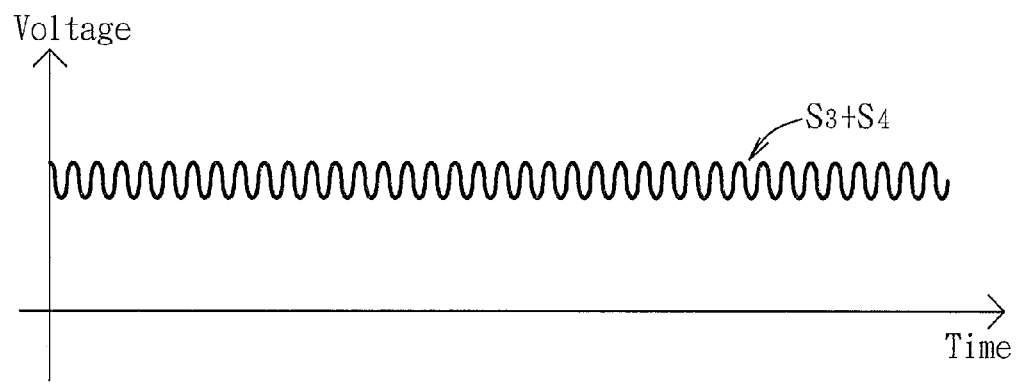
F I G. 14
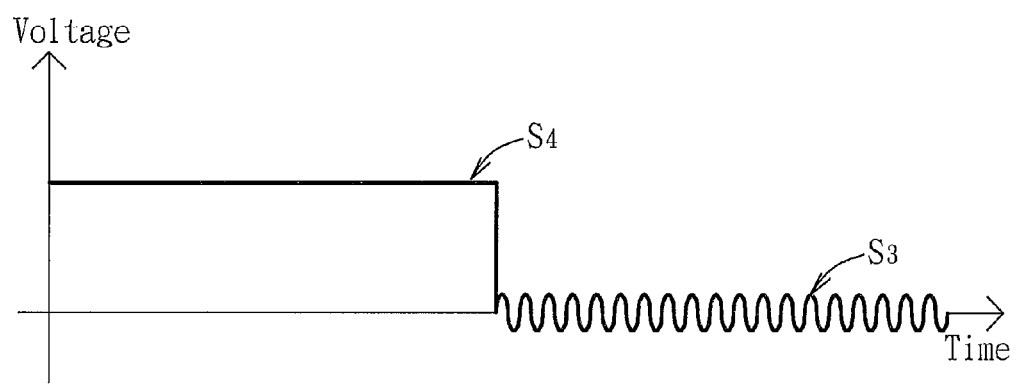
F I G. 15

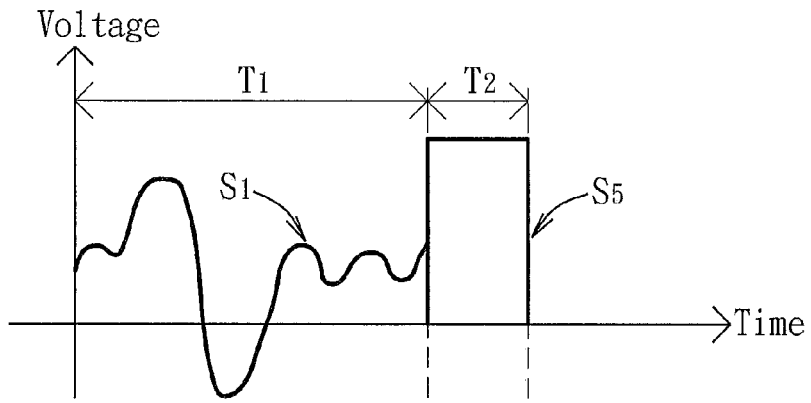
F I G. 16(a)
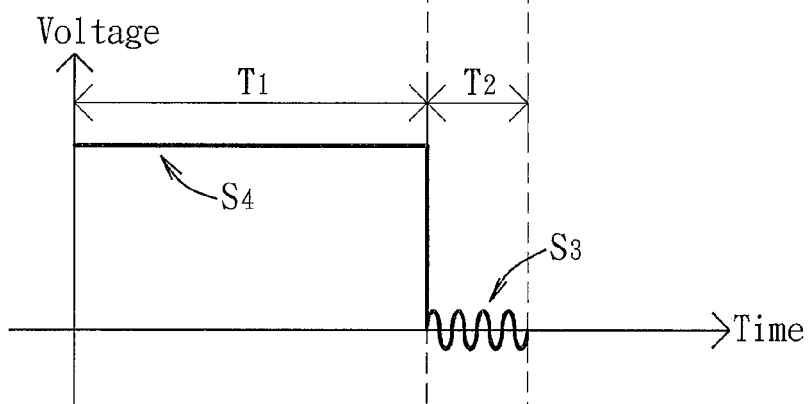
F I G. 16(b)
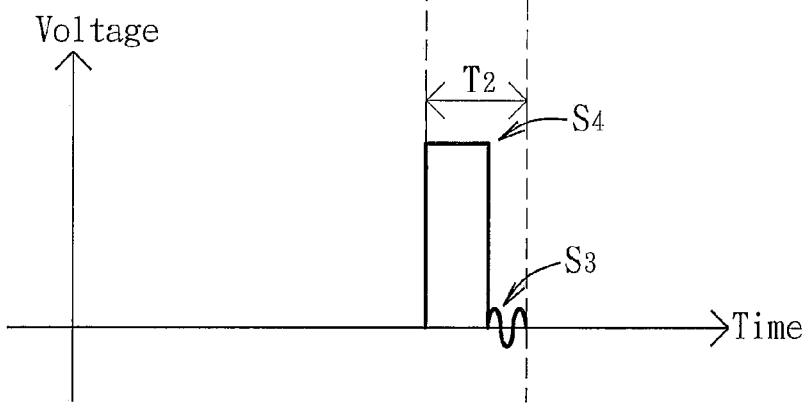
F I G. 16(c)

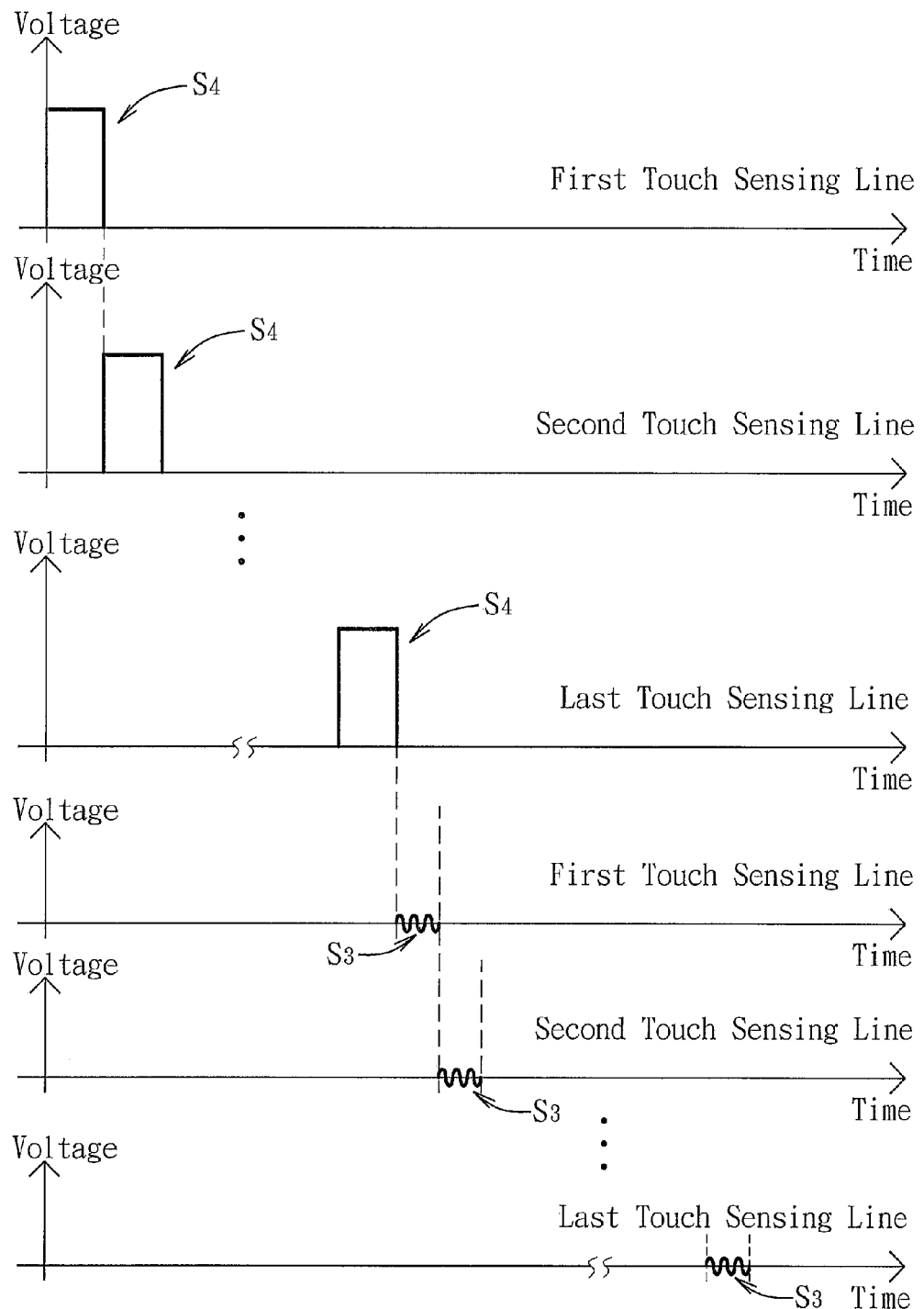
F I G. 17

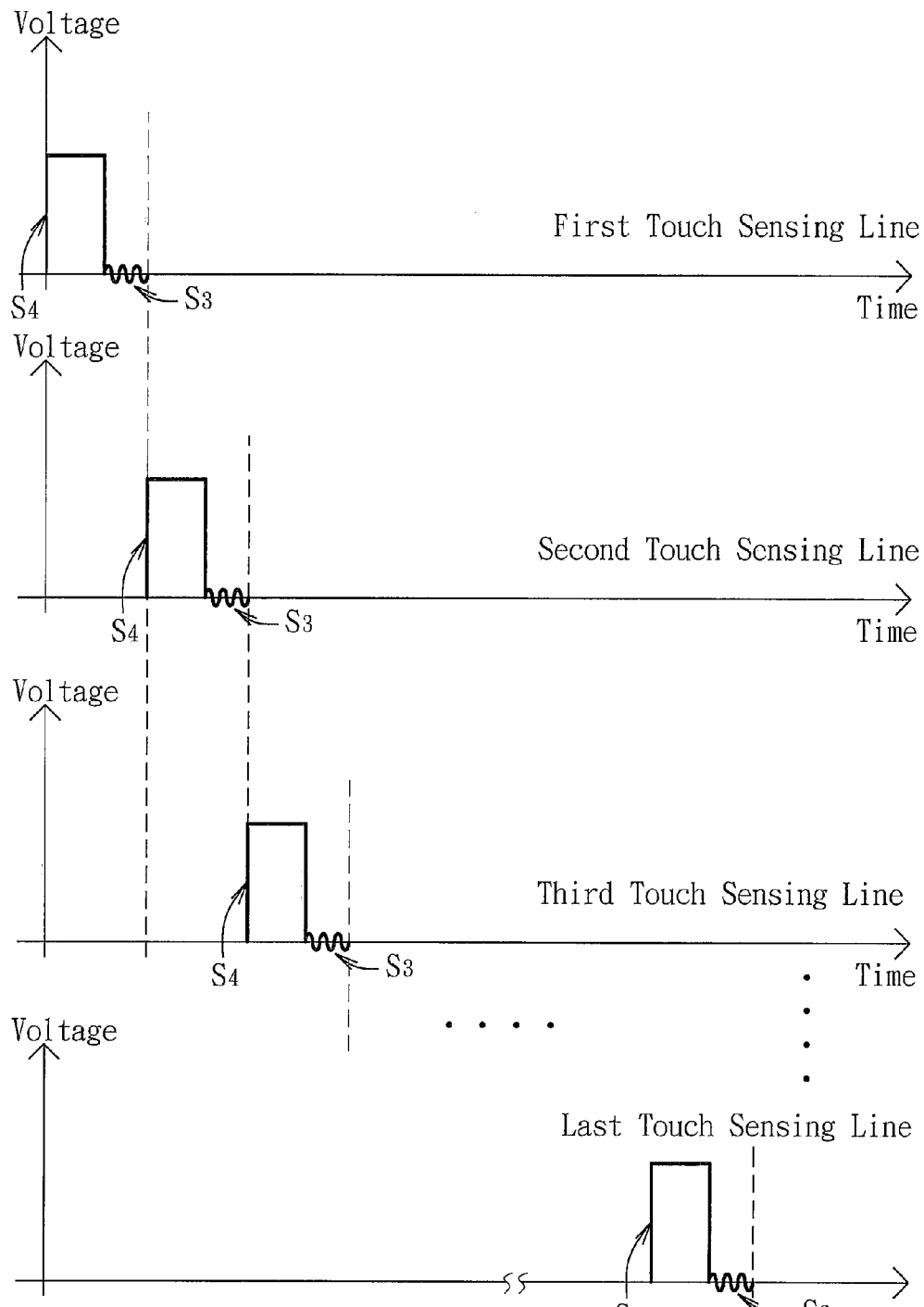
F I G. 18

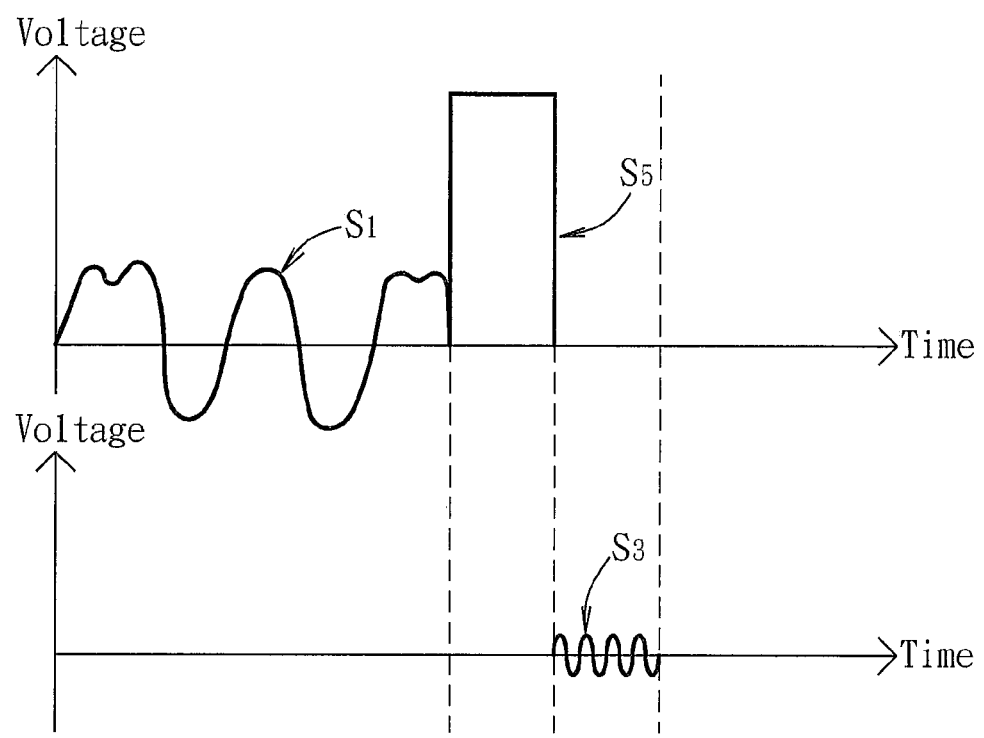
F I G. 21

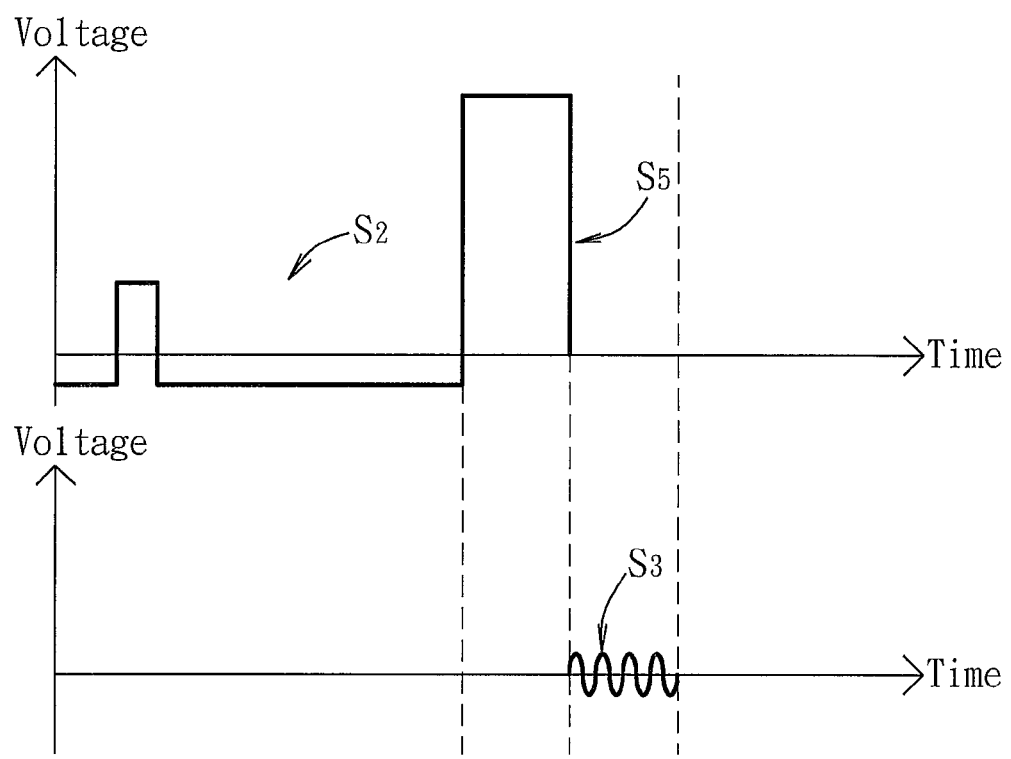
F I G. 22

METHOD FOR TRANSMITTING AND DETECTING TOUCH SENSING SIGNALS AND TOUCH DEVICE USING THE SAME

CROSS-REFERENCE TO RELATED APPLICATIONS

This application claims priority of Taiwanese Application No. 100134974, filed on Sep. 28, 2011.

This application is also a continuation-in-part of U.S. patent application Ser. Nos. 13/328,067, 13/336,721, and 13/336,355, filed by the applicant respectively on Dec. 16, 2011, Dec. 23, 2011, and Dec. 23, 2011, the entire disclosures of which are incorporated herein by reference.

BACKGROUND OF THE INVENTION

1. Field of the Invention

This invention relates to a method for transmitting and detecting touch sensing signals in a touch device, and more particularly to a method for transmitting and detecting touch sensing signals in a capacitive touch sensing circuit.

2. Description of the Related Art

A conventional touch display is constructed by stacking a touch panel onto a display panel, thereby resulting in a relatively thick and costly structure. To solve this issue, it has been proposed to integrate touch sensing circuits into a display panel for saving cost and reducing thickness of a touch display. Therefore, methods suitable for transmitting and detecting touch sensing signals in a touch display are needed.

SUMMARY OF THE INVENTION

The object of the present invention is to provide a method for transmitting and detecting touch sensing signals in a touch device.

According to this invention, a method is adapted for transmitting and detecting touch sensing signals in a touch device having a set of parallel conducting lines. The method comprises:

a) providing a work signal and a touch sensing signal to a selected portion of the conducting lines that serve as touch sensing lines and that cooperate to define a touch sensing area, wherein, for each of the touch sensing lines, the work signal is provided during a first time interval and the touch sensing signal is provided during a second time interval; and b) detecting the touch sensing lines to obtain a detecting signal that corresponds to the touch sensing signal and that indicates occurrence of a touch event, so as to determine at least one of a position and an intensity of the touch event.

BRIEF DESCRIPTION OF THE DRAWINGS

Other features and advantages of the present invention will become apparent in the following detailed description of the preferred embodiments of the invention, with reference to the accompanying drawings, in which:

FIG. 2 is a timing diagram showing a waveform of a data signal and a touch sensing signal on a touch sensing line according to the first preferred embodiment;

FIG. 3 is a timing diagram showing a waveform of a scan signal and the touch sensing signal on a touch sensing line according to the first preferred embodiment;

FIG. 4 is a timing diagram showing a waveform of the data signal and the touch sensing signal on a touch sensing line according to a modification of the first preferred embodiment;

FIG. 5 is a timing diagram showing a waveform of the scan signal and the touch sensing signal on a touch sensing line according to a modification of the first preferred embodiment;

FIG. 6 is a timing diagram showing a waveform of the data signal, the touch sensing signal, and a reference voltage signal on a touch sensing line according to a modification of the first preferred embodiment;

FIG. 7 is a timing diagram showing a waveform of the scan signal, the touch sensing signal, and the reference voltage signal on a touch sensing line according to a modification of the first preferred embodiment;

FIG. 8 is a timing diagram showing a waveform of the data signal, the touch sensing signal, and the reference voltage signal on a touch sensing line according to a modification of the first preferred embodiment;

FIG. 9 is a timing diagram showing a waveform of the scan signal, the touch sensing signal, and the reference voltage signal on a touch sensing line according to a modification of the first preferred embodiment;

FIG. 10 is a timing diagram showing a waveform of the data signal, the touch sensing signal, and the reference voltage signal on a touch sensing line according to a modification of the first preferred embodiment;

FIG. 11 is a timing diagram showing a waveform of the scan signal, the touch sensing signal, and the reference voltage signal on a touch sensing line according to a modification of the first preferred embodiment;

FIG. 12 is a timing diagram showing a waveform of the scan signal and the touch sensing signal on a touch sensing line according to a modification of the first preferred embodiment;

FIG. 14 is a timing diagram showing a waveform of the touch sensing signal and the reference voltage signal on a touch sensing line according to the second preferred embodiment;

FIG. 15 is a timing diagram showing a waveform of the touch sensing signal and the reference voltage signal on a touch sensing line according to a modification of the second preferred embodiment;

FIGS. 16(a) to 16(c) illustrate a waveform of the data signal, the touch sensing signal and the reference voltage signal on a data line and the touch sensing line according to modifications of the second preferred embodiment, respectively;

FIG. 17 is a timing diagram showing waveforms of the touch sensing signal and the reference voltage signal on the touch sensing lines according to a modification of the second preferred embodiment;

FIG. 18 is a timing diagram showing waveforms of the touch sensing signal and the reference voltage signal on the touch sensing lines according to a modification of the second preferred embodiment;

FIG. 21 is a timing diagram showing waveforms of the data signal and the reference voltage signal on the data line and the touch sensing signal on the touch sensing line; and FIG. 22 is a timing diagram showing waveforms of the scan signal and the reference voltage signal on a scan line and the touch sensing signal on the touch sensing line.

DETAILED DESCRIPTION OF THE PREFERRED EMBODIMENTS

Figure 1:
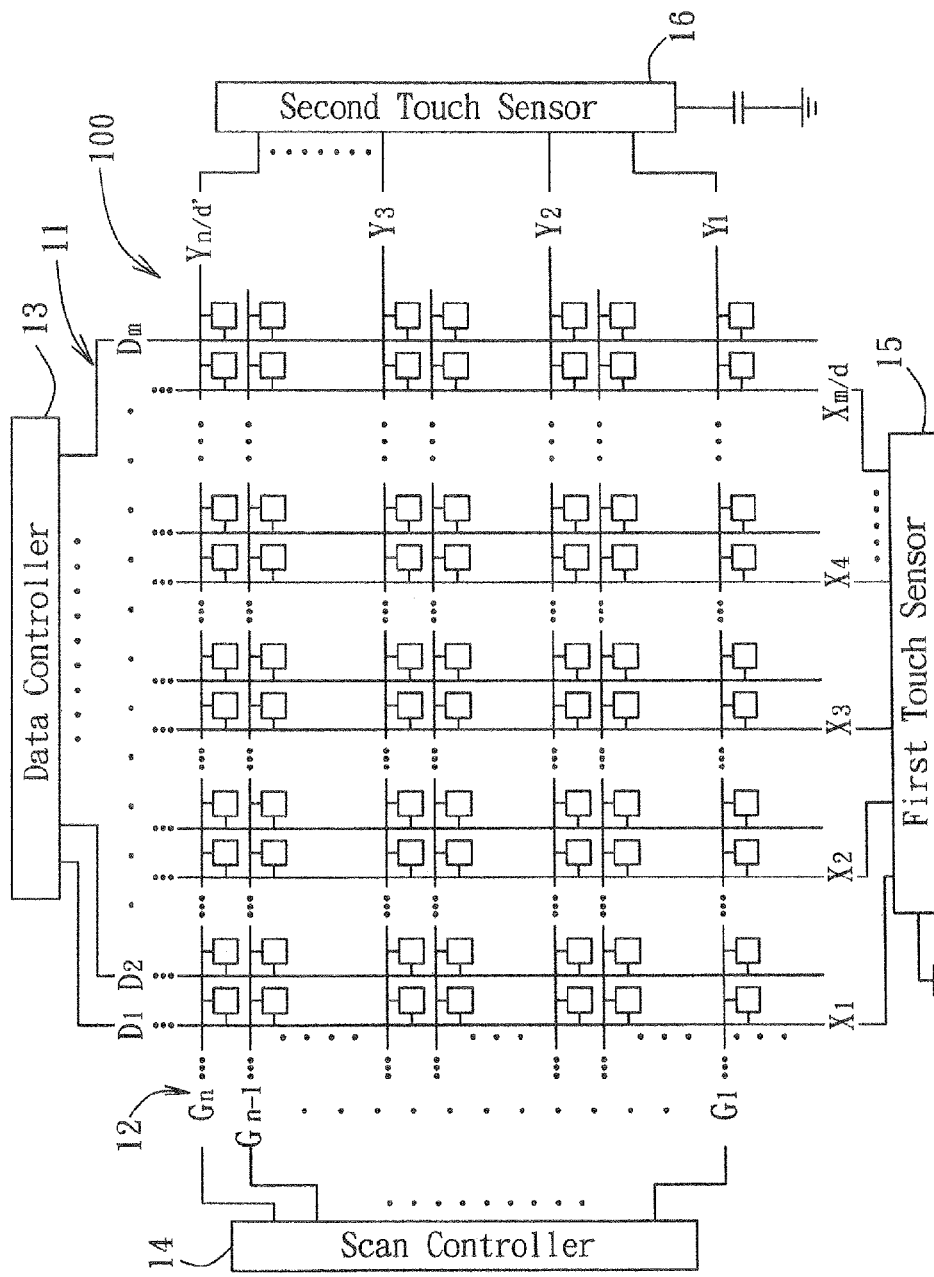
FIG. 1 is a schematic diagram illustrating a circuit structure of a touch device implementing a first preferred embodiment of the method according to the present invention.

Referring to FIG. 1, a first preferred embodiment of the method for transmitting and detecting touch sensing signals according to this invention is applied to a touch device having an active driving circuit 100. The active driving circuit 100 is adapted to drive a display panel, such as a liquid crystal display (LCD) panel, a liquid-crystal-on-silicon microdisplay panel, an electrowetting display panel, an electrophoretic display panel, an organic light-emitting diode display panel, etc. In this embodiment, the active driving circuit 100 includes a first set of parallel conducting lines 11, and a second set of parallel conducting lines 12 that cross and are electrically isolated from the first set of the conducting lines 11. The first and second sets of the conducting lines 11, 12 may respectively be one set of the data lines, scan lines, signal lines, readout lines, bias lines, power lines, control lines, common electrode lines, assisting conducting lines, compensation circuits, and signal control lines of the compensation circuits of the active driving circuit 100.

In the first preferred embodiment, the touch device is exemplified using an LCD. The first set of the conducting lines 11 are data lines $D_1 \sim D_m$ coupled to a data controller 13, and the second set of the conducting lines 12 are scan lines $G_1 \sim G_n$ coupled to a scan controller 14.

Referring to FIGS. 1 to 12, for at least one of the first and second sets of the conducting lines 11, 12, the first preferred embodiment of the method according to this invention comprises the following steps a) and b):

a) providing a work signal and a touch sensing signal $S_3$ to a selected portion of the conducting lines that serve as touch sensing lines and that cooperate to define a touch sensing area. For each touch sensing line, the work signal is provided during a first time interval $T_1$ and the touch sensing signal $S_3$ is provided during a second time interval $T_2$. In this embodiment, the first time interval $T_1$ is a display interval of the LCD, and the second time interval $T_2$ is included in a blanking interval of the LCD. For each data line, the work signal refers to a data signal $S_1$ provided by the data controller 13, and for each scan line, the work signal refers to a scan signal $S_2$ provided by the scan controller 14. In this embodiment, for the set of the data lines $D_1 \sim D_m$, the selected conducting lines that serve as touch sensing lines are denoted as $X_1 \sim X_{m/d}$ (d is a positive integer), and are coupled to a first touch sensor 15. For the set of the scan lines $G_1 \sim G_n$, the selected conducting lines that serve as touch sensing lines are denoted as $Y_1 \sim Y_{n/d'}$ (d' is a positive integer), and are coupled to a second touch sensor 16. In addition, for the set of the scan lines $G_1 \sim G_n$, frequency of the touch sensing signal $S_3$ is at least 30 times that of the scan signal $S_2$.

b) detecting the touch sensing lines to obtain a detecting signal that corresponds to the touch sensing signal $S_3$ and that indicates occurrence of a touch event, so as to determine at least one of a position and an intensity of the touch event. In this embodiment, the touch sensing signals $S_3$ provided to the touch sensing lines $X_1 \sim X_{m/d}$ are detected using the first touch sensor 15, and the touch sensing signals $S_3$ provided to the touch sensing lines $Y_1 \sim Y_{n/d'}$ are detected using the second touch sensor 16.

In one application, for each touch sensing line, the first and second time intervals $T_1$, $T_2$ are non-overlapping time intervals. Referring to FIGS. 2 and 3, the second time interval $T_2$ is after the first time interval $T_1$. Referring to FIGS. 4 and 5, in one modification, the first time interval $T_1$ is after the second time interval $T_2$.

In this embodiment, the touch device is an LCD that uses the active driving circuit 100 to control twisted angles of liquid crystal molecules in an LCD panel. In order to avoid interference with images being displayed, the touch sensing lines are preferably selected from the conducting lines under a black matrix of the LCD panel. In addition, liquid crystal molecules at different positions may have different twisted angles, and may thus affect precision of touch sensing detection. Therefore, with reference to FIGS. 6 to 9, in step a), for each of the touch sensing lines, a reference voltage signal $S_4$ may be further provided during a third time interval $T_3$ that occurs before the second time interval $T_2$ and that does not overlap with the first time interval $T_1$. The reference voltage signal $S_4$ is a DC voltage signal preferred to have a magnitude of at least 4 volts, and the third time interval $T_3$ is preferred to have a duration of at least 0.5 ms. It should be noted that the magnitude of the reference voltage signal $S_4$ is not limited to be a positive voltage, and may be a negative voltage, such as ±5V or ±20V. The higher voltage of the reference voltage signal $S_4$ may twist the liquid crystal molecules to a certain angle more quickly. FIGS. 6 and 7 show modifications of FIGS. 2 and 3, and the third time interval $T_3$ is between the first and second time intervals $T_1$ and $T_2$. FIGS. 8 and 9 show modifications of FIGS. 4 and 5, and the third time interval $T_3$ is before the first and second time intervals $T_1$ and $T_2$. By application of the reference voltage signal $S_4$ before application of the touch sensing signal $S_3$, the twisted angles of the liquid crystal molecules may be well ordered, and precision of the touch sensing detection will not be affected thereby.

However, the touch sensing signal $S_3$ and the reference voltage signal $S_4$ may be present at the same time. In one modification, for each of the touch sensing lines, the touch sensing signal $S_3$ may be mixed with the reference voltage signal $S_4$, as shown in FIGS. 10 and 11.

In another application, for each scan line, the touch sensing signal $S_3$ may be mixed with the scan signal $S_2$ and the first and second time intervals $T_1$, $T_2$ overlap, as shown in FIG. 12.

Moreover, step a) may further include coupling and uncoupling each of the touch sensing lines to a ground of a circuit board, a large capacitor, or a large conductor during a time interval that occurs before the second time interval $T_2$ and that does not overlap with the first time interval $T_1$, so that prior to providing the touch sensing signal $S_3$, the touch sensing lines have a same potential, and noise or electricity leakage may be eliminated thereby, resulting in higher precision of touch sensing detection.

It should be noted that, in other embodiments, in applications where the set of the conducting lines are common electrode lines, the touch device may include a switch circuit coupled to the touch sensing lines, and the touch sensing lines are switchable to serve as common electrode lines of the device via the switch circuit.

Figure 13:
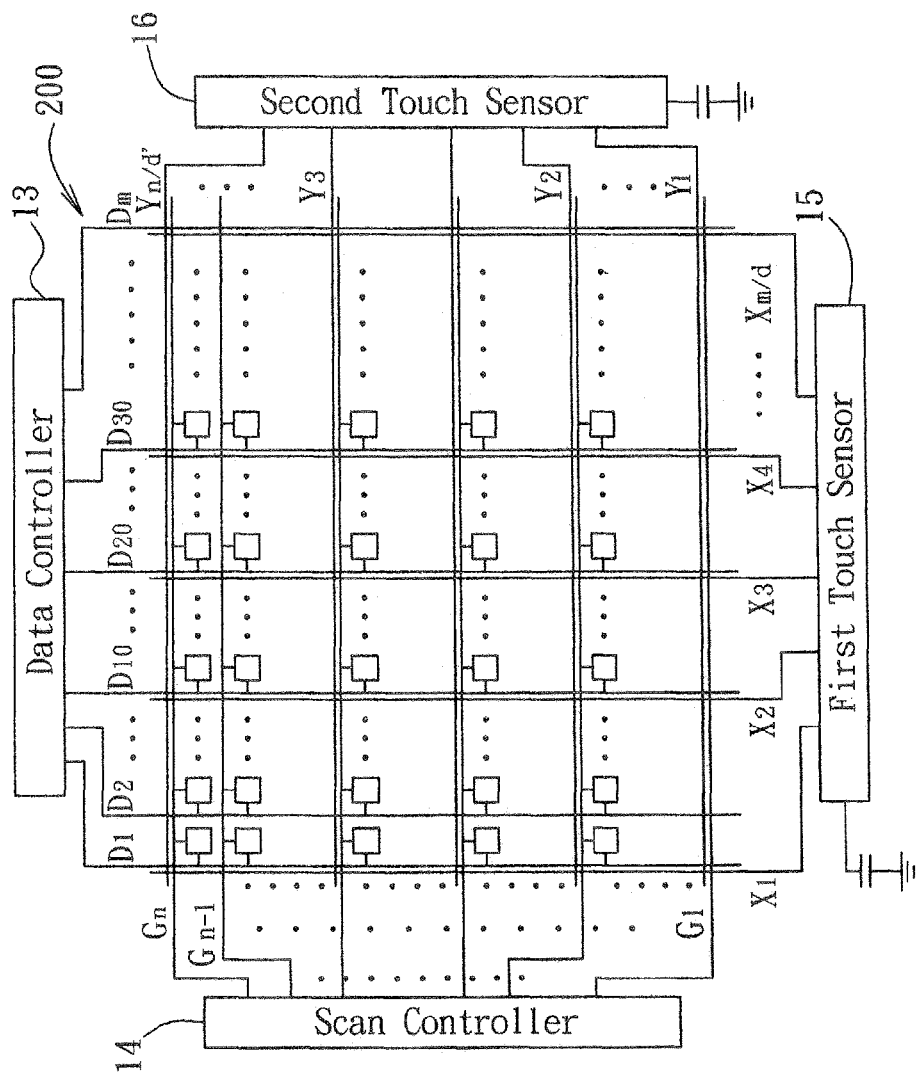
FIG. 13 is a schematic diagram illustrating a circuit structure of a touch device implementing a second preferred embodiment of the method according to the present invention.

Referring to FIG. 13, a second preferred embodiment of the method for transmitting and detecting touch sensing signals according to the present invention is adapted to be applied to a touch device having an active driving circuit 200. The active driving circuit 200 is adapted to drive a display panel, such as a liquid crystal display (LCD) panel, a liquidcrystal-on-silicon microdisplay panel, an electrowetting display panel, an electrophoretic display panel, an organic light-emitting diode display panel, etc. In this embodiment, the active driving circuit 200 includes a first set of parallel conducting lines $D_1\sim D_m$, a second set of parallel conducting lines $G_1\sim G_n$ that cross and are electrically isolated from the first set of the conducting lines $D_1\sim D_m$, a first set of parallel touch sensing lines $X_1\sim X_{m/d}$ (d is a positive integer) coupled to a first touch sensor 15, and a second set of parallel touch sensing lines $Y_1\sim Y_{n/d'}$ (d' is a positive integer) that are coupled to a second touch sensor 16, and that cross and are electrically isolated from the first set of touch sensing lines $X_1\sim X_{m/d}$. In this embodiment, for each of the first and second sets of touch sensing lines $X_1\sim X_{m/d}$ and $Y_1\sim Y_{n/d'}$, the touch sensing lines therein are arranged equidistantly. The first set of touch sensing lines $X_1\sim X_{m/d}$ may be disposed outside with respect to the first and second sets of conducting lines $D_1\sim D_m$, $G_1\sim G_n$. Like the previous embodiment, the first and second sets of the conducting lines $D_1\sim G_m$, $G_1\sim G_n$ may respectively be one set of the data lines, scan lines, signal lines, readout lines, bias lines, power lines, control lines, common electrode lines, assisting conducting lines, compensation circuits, and signal control lines of the compensation circuits of the active driving circuit 200.

In the second preferred embodiment, the touch device is exemplified using an LCD. The first set of the conducting lines $D_1\sim D_m$ are data lines coupled to a data controller 13, and the second set of the conducting lines $G_1\sim G_n$ are scan lines coupled to a scan controller 14.

Referring to FIGS. 14 to 18, for at least one pair of the sets of the conducting lines $D_1\sim D_m$ and the touch sensing lines $X_1\sim X_{m/d}$, and the sets of the conducting lines $G_1\sim G_n$ and the touch sensing lines $Y_1\sim Y_{n/d'}$, the second preferred embodiment of the method according to this invention comprises the following steps i) to iv):

i) providing a work signal to the set of conducting lines. For each data line, the work signal refers to a data signal $S_1$ provided by the data controller 13, and for each scan line, the work signal refers to a scan signal $S_2$ provided by the scan controller 14.

ii) providing a reference voltage signal to one of the set of conducting lines and the set of touch sensing lines for twist the liquid crystal molecules nearby in a desired manner.

iii) providing a touch sensing signal $S_3$ to the set of touch sensing lines.

iv) detecting the touch sensing lines to obtain a detecting signal that corresponds to the touch sensing signal $S_3$ and that indicates occurrence of a touch event, so as to determine at least one of a position and an intensity of the touch event.

In this embodiment, the touch sensing signals $S_3$ on the touch sensing lines $X_1\sim X_{m/d}$ are provided and detected using the first touch sensor 15, and the touch sensing signals $S_3$ of the touch sensing lines $Y_1\sim Y_{n/d'}$ are provided and detected using the first touch sensor 16. In other embodiments, the touch sensing signals $S_3$ of either the touch sensing lines $X_1\sim X_{m/d}$ or the touch sensing lines $Y_1\sim Y_{n/d'}$ may be provided and detected using only one touch sensor.

Referring to FIG. 14, an application of the second embodiment is shown, wherein, in step ii), the reference voltage signal $S_4$ is provided to the set of touch sensing lines, and in step iii), the touch sensing signal $S_3$ is mixed with the reference voltage signal $S_4$ such that steps ii) and iii) occur at the same time.

Referring to FIG. 15, a modification of the second embodiment is shown, wherein, in step ii), the reference voltage signal $S_4$ is provided to all of the touch sensing lines simultaneously, and in step iii), the touch sensing signal $S_3$ is respectively provided to the touch sensing lines after step ii).

FIGS. 16(a) to 16(c) show another modification of the second preferred embodiment. In particular, FIG. 16(a) shows a waveform of a signal on one of the data lines $D_1\sim D_m$. In this modification, the data signal $S_1$ is provided to the data line during a first time interval $T_1$, and a reference voltage signal $S_5$ is further provided to the data line during a second time interval $T_2$ after the first time interval $T_1$. FIGS. 16(b) and 16(c) illustrate different ways of provision of the signal on a touch sensing line that cooperates with the signal waveform shown in FIG. 16(a). In FIG. 16(b), the reference voltage signal $S_4$ is provided to the touch sensing lines during the first time interval $T_1$, so that steps i) and ii) occur at the same time, and the touch sensing signal $S_3$ is provided to the touch sensing lines during the second time interval $T_2$. In FIG. 16(c), step ii) follows step i), the reference voltage signal $S_4$ is provided to the set of the touch sensing lines in step ii), and step iii) follows step ii), so that the reference voltage signal $S_4$ and the touch sensing signal $S_3$ are provided to the touch sensing line during the second time interval $T_2$.

Moreover, it is known that the LCD includes a backlight module serving as a light source. When the reference voltage signal $S_5$ is provided to the data lines $D_1\sim D_m$, the output of the backlight module may be dimmed or turned off.

Referring to FIG. 17, a modification of the second embodiment is shown, wherein, in step ii), the reference voltage signal $S_4$ is provided to the touch sensing lines in sequence, and in step iii), the touch sensing signal $S_3$ is provided to the touch sensing lines in sequence after step ii).

Referring to FIG. 18, a modification of the second embodiment is shown, wherein, in step ii), the reference voltage signal $S_4$ is provided to the touch sensing lines in sequences and in step iii), the touch sensing signal $S_3$ is provided to one of the touch sensing lines immediately after providing the reference voltage signal $S_4$ to said one of the touch sensing lines.

In addition, the reference voltage signal $S_4$ may be further applied to all or a portion of pixels of a pixel electrode layer of the LCD by the data controller 13 and the scan controller 14, so that the liquid crystal molecules nearby can be well-ordered. It should be noted that the reference voltage signals $S_4$, $S_5$ are both DC voltages preferably having a magnitude of at least 4 volts, and a duration of at least 0.5 ms.

Moreover, step iii) may further include coupling and uncoupling each of the touch sensing lines to a ground, a large capacitor, or a large conductor during a time interval that occurs before providing the touch sensing signal $S_3$ to the touch sensing lines for eliminating noise or electricity leakage, resulting in higher precision of touch sensing detection.

Figure 19:
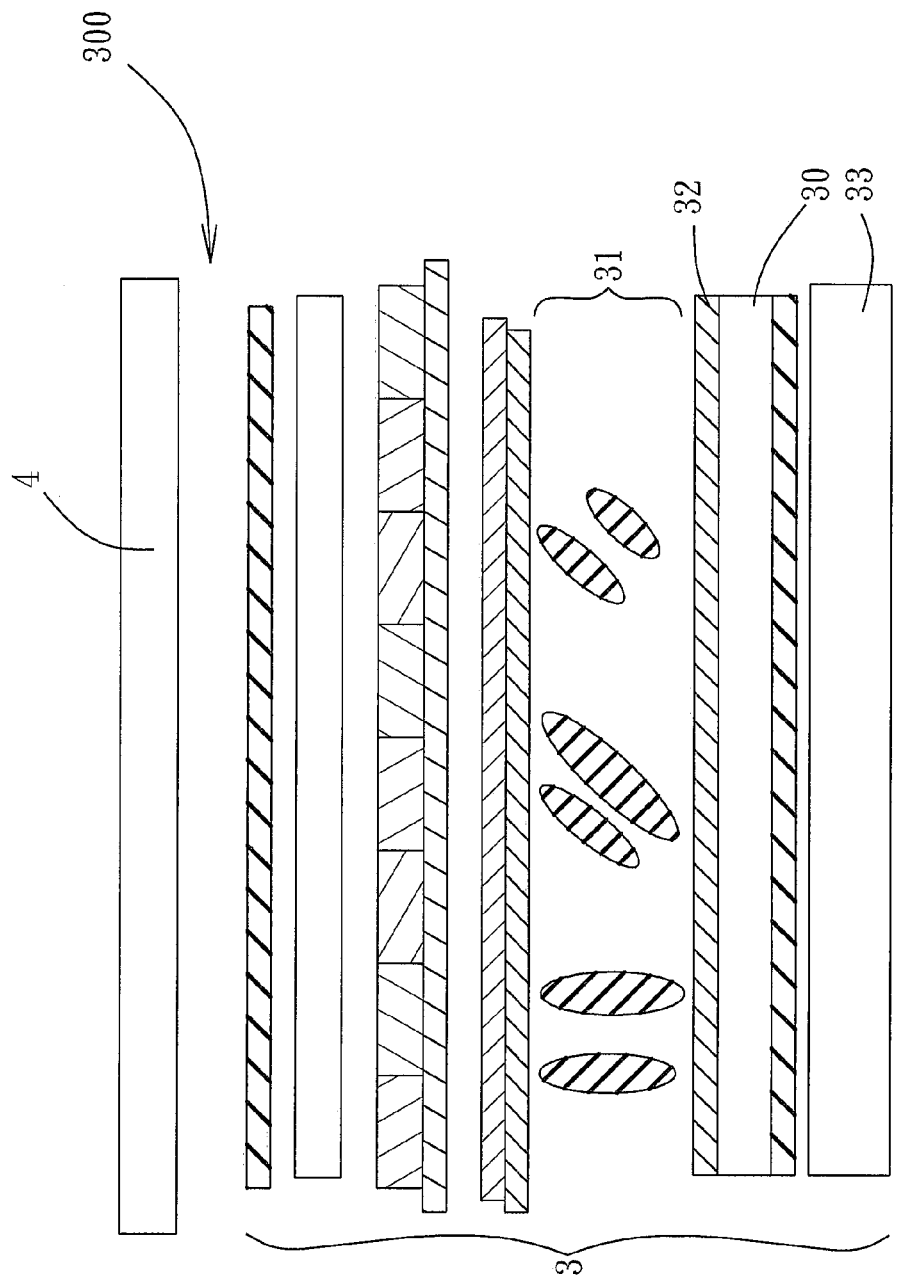
FIG. 19 is a schematic sectional view of a touch display implementing a third preferred embodiment of the method according to the present invention.
Figure 20:
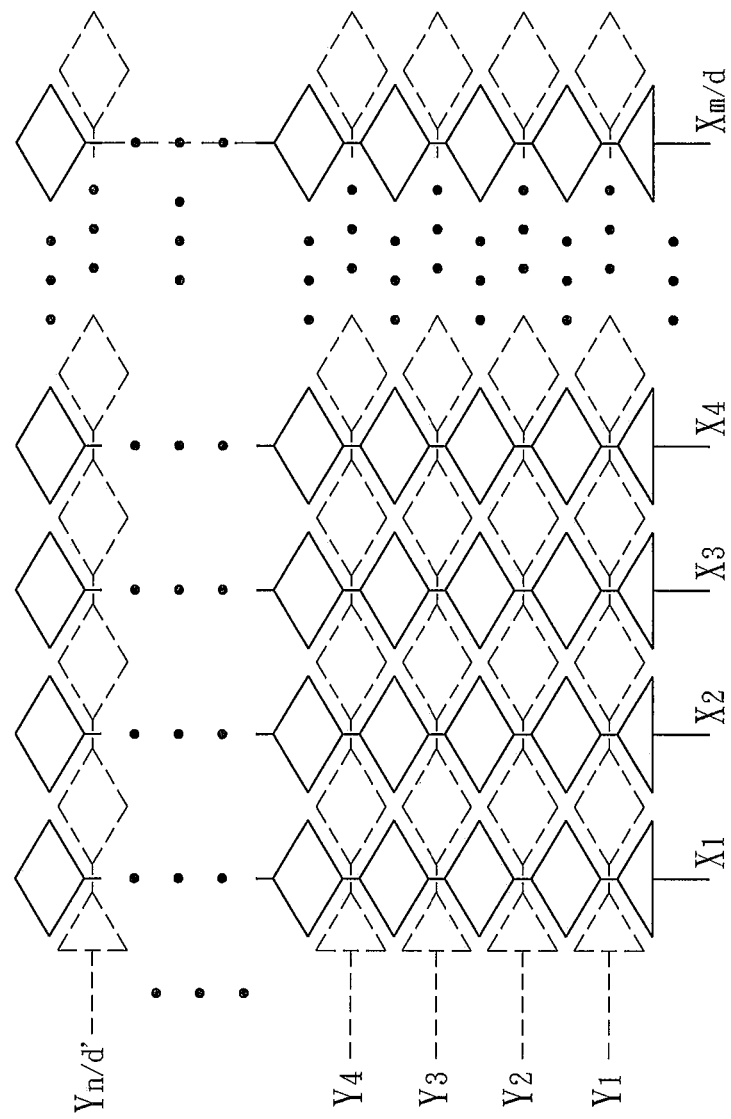
FIG. 20 is a schematic diagram showing a capacitive touch sensing layer of the touch display according to the third preferred embodiment.

Referring to FIG. 19, a third preferred embodiment of the method for transmitting and detecting touch sensing signals according to the present invention is adapted to be applied to a touch display 300 including an LCD 3 and a capacitive touch sensing layer 4 disposed on the LCD 3. The LCD 3 includes a liquid crystal layer 31, a pixel electrode layer 32 disposed on a substrate 30, and a backlight module 33 disposed opposite to the pixel electrode layer 32 with respect to the substrate 30. The pixel electrode layer 32 includes a first set of parallel conducting lines $D_1\sim D_m$, and a second set of parallel conducting lines $G_1\sim G_n$ that cross and are electrically isolated from the first set of conducting lines $D_1\sim D_m$. The first set of conducting lines $D_1\sim D_m$ are data lines coupled to a data controller (not shown), and the second set of conducting lines $G_1\sim G_n$ are scan lines coupled to a scan controller (not shown) in this embodiment. The data and scan controllers are operable to provide respectively data and scan signals $S_1$, $S_2$ to the data and scan lines $D_1 \sim D_m$, $G_1 \sim G_n$, so as to drive the liquid crystal layer 31. Referring to FIG. 20, the capacitive touch sensing layer includes a first set of parallel touch sensing lines $X_1 \sim X_{m/d}$ (d is a positive integer) coupled to a first touch sensor (not shown), and a second set of parallel touch sensing lines $Y_1 \sim Y_{n/d'}$ (d' is a positive integer) that are coupled to a second touch sensor (not shown) and that cross and are electrically isolated from the first set of the touch sensing lines $X_1 \sim X_{m/d}$. The first and second touch sensors are operable to detect the touch sensing signals from the first and second sets of the touch sensing lines $X_1 \sim X_{m/d}$, $Y_1 \sim Y_{n/d'}$, respectively. The third preferred embodiment is modified from the second preferred embodiment, and the differences between the second and third preferred embodiments are as follows:

1. In step ii), the reference voltage signal $S_5$ is provided to the conducting lines after step i).

2. In step iii), the touch sensing signal $S_3$ is provided to the touch sensing lines after step ii).

Referring to FIG. 21, the data controller provides the data signal $S_1$ to the data line, followed by providing the reference voltage signal $S_5$ to the data line. Then, the touch sensing signal $S_3$ is provided to the corresponding set of touch sensing lines.

Referring to FIG. 22, the scan controller provides the scan signal $S_2$ to the scan line, followed by providing the reference voltage signal $S_5$ to the scan line. Then, the touch sensing signal $S_3$ is provided to the corresponding set of touch sensing lines.

In addition, the reference voltage signal $S_5$ may be further applied to all or a portion of pixels of a pixel electrode layer of the LCD by the data controller and the scan controller, so that the liquid crystal molecules nearby can be well-ordered. The reference voltage signal $S_5$ herein is a DC voltage preferable to have a magnitude of at least 4 volts. It should be noted that, when the reference voltage signal $S_5$ is provided to the data lines and the scan lines, the output of the backlight module 33 of the LCD 3 is preferred to be dimmed or turned off.

Moreover, step iii) may further include coupling and uncoupling each of the touch sensing lines to a ground of a circuit board, a large capacitor, or a large conductor during a time interval that occurs before providing the touch sensing signal $S_3$ to the touch sensing lines for eliminating noise or electricity leakage, resulting in higher precision of touch sensing detection.

To sum up, the present invention provides s methods for transmitting and detecting touch sensing signals in a touch device, uses a reference voltage signal to order the arrangement of liquid crystal molecules of an LCD, and eliminates noise and electricity leakage by grounding the conducting lines of the touch device for a short time period, to thereby enhance precision of touch sensing detection.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method for transmitting and detecting touch sensing signals in a touch device having a set of parallel conducting lines, said method comprising:

providing a work signal to a selected portion of the conducting lines that serve as touch sensing lines and that cooperate to define a touch sensing area;

providing, by a touch sensor circuit electrically coupled to each of the touch sensing lines, a touch sensing signal to the touch sensing lines;

wherein, for each of the touch sensing lines, the work signal is provided during a first time interval and the touch sensing signal is provided during a second time interval; and detecting the touch sensing lines to obtain a detecting signal that corresponds to the touch sensing signal and that indicates occurrence of a touch event, so as to determine at least one of a position and an intensity of the touch event.

2. The method as claimed in claim 1, wherein, for each of the touch sensing lines, the first and second time intervals are non-overlapping time intervals.

3. The method as claimed in claim 2, wherein, for each of the touch sensing lines, a reference voltage signal is further provided during a third time interval that occurs before the second time interval and that does not overlap with the first time interval.

4. The method as claimed in claim 2, wherein, for each of the touch sensing lines, the touch sensing signal is an alternating current (AC) signal, and is mixed with a reference voltage signal having a constant voltage to obtain a direct current (DC) offset.

5. The method as claimed in claim 1, wherein, for each of the touch sensing lines, the touch sensing signal is an alternating current (AC) signal, and is mixed with the work signal having a constant voltage to obtain a direct current (DC) offset, and the first and second time intervals overlapping.

6. The method as claimed in claim 1, wherein the touch device is a touch display, and the set of conducting lines is one of a set of data lines and a set of scan lines of the touch display.

7. The method as claimed in claim 1, further comprising: coupling and uncoupling each of the touch sensing lines to one of a ground, a conductor, and a capacitor during a third time interval that occurs before the second time interval and that does not overlap with the first time interval.

8. The method as claimed in claim 1, wherein the touch device is a touch display including a switch circuit coupled to the touch sensing lines, the touch sensing lines being switchable to serve as common electrodes of the touch display via the switch circuit.

9. The method as claimed in claim 1, wherein the touch device is a touch display selected from a liquid crystal display including a liquid crystal layer and another set of parallel conducting lines that cross and cooperate with said one set of parallel conducting lines to drive the liquid crystal layer, a liquid-crystal-on-silicon microdisplay, an electrowetting display, an electrophoretic display, and an organic light-emitting diode display.

10. The method as claimed in claim 1, wherein the touch device is a touch display, the first time interval is a display interval of the touch display, and the second time interval is included in a blanking interval of the touch display.

11. A method for transmitting and detecting touch sensing signals in a touch device having a set of conducting lines and a set of touch sensing lines, said method comprising:

i) providing a work signal to the set of conducting lines;

ii) providing a reference voltage signal to one of the set of conducting lines and the set of touch sensing lines;

iii) providing a touch sensing signal to the set of touch sensing lines; and iv) detecting the touch sensing lines to obtain a detecting signal that corresponds to the touch sensing signal and that indicates occurrence of a touch event, so as to determine at least one of a position and an intensity of the touch event.

12. The method as claimed in claim 11, wherein, in step ii), the reference voltage signal is provided to the set of touch sensing lines, and in step iii), the touch sensing signal is an alternating current (AC) signal, and is mixed with the reference voltage signal having a constant voltage to obtain a direct current (DC) offset, such that steps and iii) occur at the same time.

13. The method as claimed in claim 11, wherein, in step ii), the reference voltage signal is provided to all of the touch sensing lines simultaneously, and in step iii), the touch sensing signal is respectively provided to the touch sensing lines after step ii).

14. The method as claimed in claim 13, wherein steps i) and ii) occur at the same time.

15. The method as claimed in claim 13, further comprising providing the reference voltage signal to the touch sensing lines while the work signal is provided to the conducting lines,
wherein, in step ii), the reference voltage signal is provided to the conducting lines, and steps and iii) occur at the same time.

16. The method as claimed in claim 13, wherein step ii) follows step i), the reference voltage signal is provided to the set of touch sensing lines in step ii), and step iii) follows step ii).

17. The method as claimed in claim 16, further comprising providing the reference voltage signal to the conducting lines while either of the reference voltage signal and the touch sensing signal is provided to the touch sensing lines.

18. The method as claimed in claim 11, wherein:
in step ii), the reference voltage signal is provided to the touch sensing lines one by one, and
in step iii), the touch sensing signal is provided to the touch sensing lines one by one after step ii).

19. The method as claimed in claim 11, wherein:
in step ii), the reference voltage signal is provided to the touch sensing lines in one by one; and
in step iii), the touch sensing signal is provided to one of the touch sensing lines immediately after providing the reference voltage signal to said one of the touch sensing lines.

20. The method as claimed in claim 11, wherein step iii) includes coupling and uncoupling each of the touch sensing lines to one of a ground, a conductor, and a capacitor before providing the touch sensing signal to the touch sensing lines.

21. The method as claimed in claim 11, wherein the touch device is a touch display selected from a liquid crystal display including a liquid crystal layer and another set of conducting lines that cross and cooperate with said one set of conducting lines to drive the liquid crystal layer, a liquid-crystal-on-silicon microdisplay, an electrowetting display, an electrophoretic display, and an organic light-emitting diode display.

22. The method as claimed in claim 21, wherein the touch device is the liquid crystal display further includes a backlight module serving as a light source, said method further comprising one of dimming light output of the backlight module and turning off the backlight module simultaneous with step ii) when the reference voltage signal is provided to the set of conducting lines.

23. The method as claimed in claim 11, wherein:
the touch device is a touch display including a liquid crystal display (LCD), and a capacitive touch sensing layer disposed on the LCD, the conducting lines being included in the LCD, the touch sensing lines being included in the capacitive touch sensing layer;
in step ii), the reference voltage signal is provided to the conducting lines after step i); and
in step), the touch sensing signal is provided to the touch sensing lines after step ii).

24. The method as claimed in claim 23, wherein the LCD further includes a backlight module serving as a light source, said method further comprising one of dimming light output of the backlight module and turning off the backlight module simultaneous with step ii).

25. The method as claimed in claim 23, wherein step iii) includes coupling and uncoupling each of the touch sensing lines to one of a ground, a conductor, and a capacitor before providing the touch sensing signal to the touch sensing lines.

* * * * *